US011012812B2

(12) United States Patent
Rothschild (10) Patent No.: US 11,012,812 B2
(45) Date of Patent: *May 18, 2021

(54) SYSTEM AND METHOD FOR IDENTIFYING ASSOCIATED SUBJECTS FROM LOCATION HISTORIES

(71) Applicant: Verint Systems Ltd., Pituach (IL)

(72) Inventor: Shlomo Rothschild, Nitzan (IL)

(73) Assignee: VERINT SYSTEMS LTD., Pituach (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/020,947

(22) Filed: Sep. 15, 2020

(65) Prior Publication Data

US 2020/0413220 A1    Dec. 31, 2020

Related U.S. Application Data

(63) Continuation of application No. 16/358,827, filed on Mar. 20, 2019.

(30) Foreign Application Priority Data

Mar. 20, 2018    (IL) .......................................... 258250

(51) Int. Cl.
*H04W 4/02* (2018.01)
*H04W 4/029* (2018.01)

(52) U.S. Cl.
CPC ........... *H04W 4/023* (2013.01); *H04W 4/029* (2018.02)

(58) Field of Classification Search
CPC ............................. H04W 4/023; H04W 4/029
See application file for complete search history.

(56) References Cited

U.S. PATENT DOCUMENTS 7,797,265 B2    9/2010  Brinker et al.
9,600,568 B2    3/2017  Rangan
(Continued)

OTHER PUBLICATIONS

Bao, J. et al., "Location-based and Preference-Aware Recommendation Using Sparse Geo-Social Networking Data," Proceedings of the 20th International Conference on Advances in Geographic Information Systems, ACM, 2012, pp. 199-208.
(Continued)

*Primary Examiner* — Marcos L Torres
(74) *Attorney, Agent, or Firm* — Isus Intellectual Property PLL; Anthony Jason Mirabito (57) ABSTRACT

Systems and methods to track the respective locations of subjects over time. The system identifies subjects who, over time, were co-located with one another suggesting they are associated with one another, and the pairs are analyzed. For each of the subjects, the system produces a vector that quantifies the subject's location history by including a respective weight for each combination of a time interval with a geographical area. The vectors are compared using a distance metric, and any pair of subjects whose vectors are sufficiently close are flagged as being an associated pair. The respective vector belonging to each subject is normalized to account for the total number of other subjects who were co-located with the subject. For each interval-area pair, the system may compute the frequency of the interval-area pair, and then divide each weight that corresponds to the interval-area pair by the frequency of the interval-area pair.

20 Claims, 3 Drawing Sheets

(56) References Cited

U.S. PATENT DOCUMENTS

| | | | |
|---|---|---|---|
| 2014/0039840 A1* | 2/2014 | Yuen | G01P 13/00 702/189 |
| 2015/0211845 A1* | 7/2015 | Le Grand | H04W 4/023 702/150 |
| 2019/0037358 A1* | 1/2019 | Jenkins | H04L 61/2007 |

OTHER PUBLICATIONS

Chi, L., et al., "Hashing Techniques: A Survey and Taxonomy," ACM Computing Surveys, vol. 50, No. 1, Article 11, 2017, 36 pages.

Quercia, D., et al., "Recommending Social Events from Mobile Phone Location Data," 2010 IEEE 10the International Conference on Data Mining (ICDM), IEEE, Sydney, Australia, Dec. 14-17, 2010, 6 pages.

Ramos, J., "Using tf-idf to Determine Word Relevance in Document Queries," Department of Computer Science, Rutgers University, 2013, 4 pages.

Rekimoto, J., et al., "LifeTag: WiFi-Based Continuous Location Logging for Life Pattern Analysis," LoCA., Proceedings of the Third International Symposium, Oberpfaffenhofe, Germany, Sep. 20-21, 2007, pp. 35-49.

Stein, B., "Principles of Hash-based Text Retrieval," SIGIR '07 Workshop on Learning to Rank for Information Retrieval, Jul. 23-27, 2007, pp. 527-534.

Turney, P., et al., "From Frequency to Meaning: Vector Space Models of Semantics," Journal of Artificial Intelligence Research, vol. 37, 2010, pp. 141-188.

* cited by examiner

SYSTEM AND METHOD FOR IDENTIFYING ASSOCIATED SUBJECTS FROM LOCATION HISTORIES

This application is a continuation of U.S. patent application Ser. No. 16/358,827, filed Mar. 20, 2019, entitled "SYSTEM AND METHOD FOR IDENTIFYING ASSOCIATED SUBJECTS FROM LOCATION HISTORIES," which is incorporated herein by reference in its entirety.

FIELD OF THE DISCLOSURE

The present disclosure relates generally to the monitoring of subjects of interest, such as for law-enforcement or security purposes.

BACKGROUND OF THE DISCLOSURE

In many cases, law-enforcement or security agencies may track the location of a subject of interest over time.

Ramos, Juan, "Using tf-idf to determine word relevance in document queries," Proceedings of the first instructional conference on machine learning, Vol. 242, 2003, examines the results of applying Term Frequency Inverse Document Frequency (TF-IDF) to determine what words in a corpus of documents might be more favorable to use in a query.

Quercia, Daniele, et al., "Recommending social events from mobile phone location data," Data Mining (ICDM), 2010 IEEE 10th International Conference on. IEEE, 2010, describes sampling location estimations of one million mobile phone users in Greater Boston, combining the sample with social events in the same area, inferring the social events attended by 2,519 residents, and, upon this data, testing a variety of algorithms for recommending social events.

Bao, Jie et al., "Location-based and preference-aware recommendation using sparse geo-social networking data," Proceedings of the 20th international conference on advances in geographic information systems, ACM, 2012, presents a location-based and preference-aware recommender system that offers a particular user a set of venues (such as restaurants) within a geospatial range with the consideration of both: 1) user preferences, which are automatically learned from her location history and 2) social opinions, which are mined from the location histories of the local experts.

Rekimoto, Jun, et al., "LifeTag: WiFi-based continuous location logging for life pattern analysis," LoCA., Vol. 2007, proposes a WiFi-based location detection technology for location logging.

SUMMARY OF THE DISCLOSURE

There is provided, in accordance with some embodiments of the present invention, a system that includes a communication interface and a processor. The processor is configured to receive, via the communication interface, tracking data that indicate respective locations of a plurality of subjects within a plurality of geographic areas and during a plurality of time intervals. The processor is further configured to, responsively to the tracking data, calculate a plurality of weights, including a respective weight corresponding to each combination of a subject, a geographic area, and a time interval, which quantifies a degree to which the tracking data indicate that the subject was located in the geographic area during the time interval. The processor is further configured to select a plurality of interval-area pairs, each of which includes a respective one of the geographic areas and a respective one of the time intervals. The processor is further configured to, for each of the selected interval-area pairs, normalize a respective subset of the weights that correspond to respective combinations of the subjects with the selected interval-area pair, and to construct a plurality of vectors, including, for each of the subjects, a respective vector that includes those of the normalized weights that correspond to respective combinations of the subject with the selected interval-area pairs. The processor is further configured to calculate respective measures of similarity between one or more pairs of the vectors, and to generate, in response to the measures of similarity, an output indicating respective pairings of one or more pairs of the subjects.

In some embodiments, the processor is configured to calculate each of the weights responsively to a percentage of the time interval during which the subject was located in the geographic area that is indicated by the tracking data.

In some embodiments, the processor is configured to calculate each of the weights by:
calculating a level of confidence that the tracking data indicate that the subject was located in the geographic area during the time interval, and
calculating the weight responsively to the level of confidence.

In some embodiments, the processor is configured to select the interval-area pairs by: for each of the interval-area pairs:
computing a sum of those of the weights that correspond to respective combinations of the subjects and the interval-area pair, and
selecting the interval-area pair responsively to the sum.

In some embodiments, the processor is configured to select the interval-area pairs by: for each of the interval-area pairs:
computing a number of those of the weights that correspond to respective combinations of the subjects and the interval-area pair and are greater than zero, and
selecting the interval-area pair responsively to the number.

In some embodiments, the processor is configured to normalize the respective subset of the weights by:
calculating a normalizing factor as (i) an increasing function of a sum of the subset of the weights, and (ii) a decreasing function of a total sum of the weights, and
normalizing the subset of the weights by the normalizing factor.

In some embodiments, the processor is configured to normalize the respective subset of the weights by:
calculating a normalizing factor as (i) an increasing function of a number of those of the weights in the subset that are greater than zero, and (ii) a decreasing function of a total number of the subjects, and
normalizing each of the weights in the subset by the normalizing factor.

In some embodiments, the processor is further configured to, subsequently to constructing the vectors, reduce a dimensionality of the vectors.

In some embodiments, the processor is further configured to, prior to calculating the measures of similarity:
cluster the vectors into a plurality of different clusters, and
subsequently to clustering the vectors, select the pairs of the vectors in response to each of the pairs of the vectors being contained within a same one of the clusters or within respective ones of the clusters that are within a predefined threshold distance of one another.

There is further provided, in accordance with some embodiments of the present invention, a method that includes receiving tracking data that indicate respective locations of a plurality of subjects within a plurality of geographic areas and during a plurality of time intervals. The method further includes, responsively to the tracking data, calculating a plurality of weights, including a respective weight corresponding to each combination of a subject, a geographic area, and a time interval, which quantifies a degree to which the tracking data indicate that the subject was located in the geographic area during the time interval. The method further includes selecting a plurality of interval-area pairs, each of which includes a respective one of the geographic areas and a respective one of the time intervals. The method further includes, for each of the selected interval-area pairs, normalizing a respective subset of the weights that correspond to respective combinations of the subjects and the interval-area pair, and constructing a plurality of vectors, including, for each of the subjects, a respective vector that includes those of the normalized weights that correspond to respective combinations of the subject and the selected interval-area pairs. The method further includes calculating respective measures of similarity between one or more pairs of the vectors, and, in response to the measures of similarity, generating an output indicating respective pairings of one or more pairs of the subjects.

There is further provided, in accordance with some embodiments of the present invention, a computer software product including a tangible non-transitory computer-readable medium in which program instructions are stored. The instructions, when read by a processor, cause the processor to receive tracking data that indicate respective locations of a plurality of subjects within a plurality of geographic areas and during a plurality of time intervals, and, responsively to the tracking data, calculate a plurality of weights, including a respective weight corresponding to each combination of a subject, a geographic area, and a time interval, which quantifies a degree to which the tracking data indicate that the subject was located in the geographic area during the time interval. The instructions further cause the processor to select a plurality of interval-area pairs, each of which includes a respective one of the geographic areas and a respective one of the time intervals. The instructions further cause the processor to, for each of the selected interval-area pairs, normalize a respective subset of the weights that correspond to respective combinations of the subjects and the interval-area pair, and construct a plurality of vectors, including, for each of the subjects, a respective vector that includes those of the normalized weights that correspond to respective combinations of the subject and the selected interval-area pairs. The instructions further cause the processor to calculate respective measures of similarity between one or more pairs of the vectors, and, in response to the measures of similarity, generate an output indicating respective pairings of one or more pairs of the subjects.

The present disclosure will be more fully understood from the following detailed description of embodiments thereof, taken together with the drawings, in which:

DETAILED DESCRIPTION OF EMBODIMENTS

Overview

In many cases, law-enforcement or security agencies may wish to identify people who are associated, in some capacity, with a subject of interest (SOI), such as family members or coworkers of the SOI.

To facilitate identifying such associations, embodiments of the present disclosure provide a system configured to track the respective locations of multiple subjects over time. Based on the tracking, the system identifies each pair of subjects who, over the tracking period, were co-located with one another in a manner that suggests that the pair of subjects are associated with one another, and then flags each of these pairs for subsequent analysis.

Typically, for each of the tracked subjects, the system produces a vector that quantifies the subject's location history by including a respective weight for each relevant combination of a time interval with a geographical area. For example, if a particular subject was present in area XYZ for 80% of time interval ABC, the subject's location-history vector may include a weight of 0.8 associated with the interval-area pair ABC-XYZ. Subsequently to constructing the subjects' vectors, the vectors are compared to each other using a suitable distance metric (or "similarity measure"), and any pair of subjects whose vectors are sufficiently close to one another are flagged as being a potentially associated pair.

Typically, before comparing the vectors, the respective vector belonging to each subject is normalized to account for the total number of other subjects who were co-located with the subject, such as to reduce the number of spurious associations that are identified. Thus, for example, if two particular subjects were located together in a stadium, during game time, with thousands of other subjects, the system is less likely to identify an association between the two subjects, relative to if the two subjects were co-located in the stadium while the stadium was almost empty.

For example, for each interval-area pair, the system may compute the frequency of the interval-area pair (typically by computing the percentage of the vectors in which the interval-area pair appears with a non-zero weight), and then divide each weight that corresponds to the interval-area pair by the frequency of the interval-area pair. Thus, for example, assuming that the interval-area pair ABC-XYZ has a frequency of 0.00001 (indicating that only 0.001% of the tracked subjects were in area XYZ during time interval ABC), a weight of 0.8 for ABC-XYZ may be converted to a relatively large vector element of $0.8/0.00001=80000$, such that the contribution of ABC-XYZ to the similarity measure may be relatively large. In contrast, if the frequency of ABC-XYZ were 0.01 (indicating that a relatively large percentage—1%—of the tracked subjects were in area XYZ during time interval ABC), the weight of 0.8 would be converted to a relatively small vector element of 80, such that ABC-XYZ would contribute less to the similarity measure.

System Description

Figure 1:
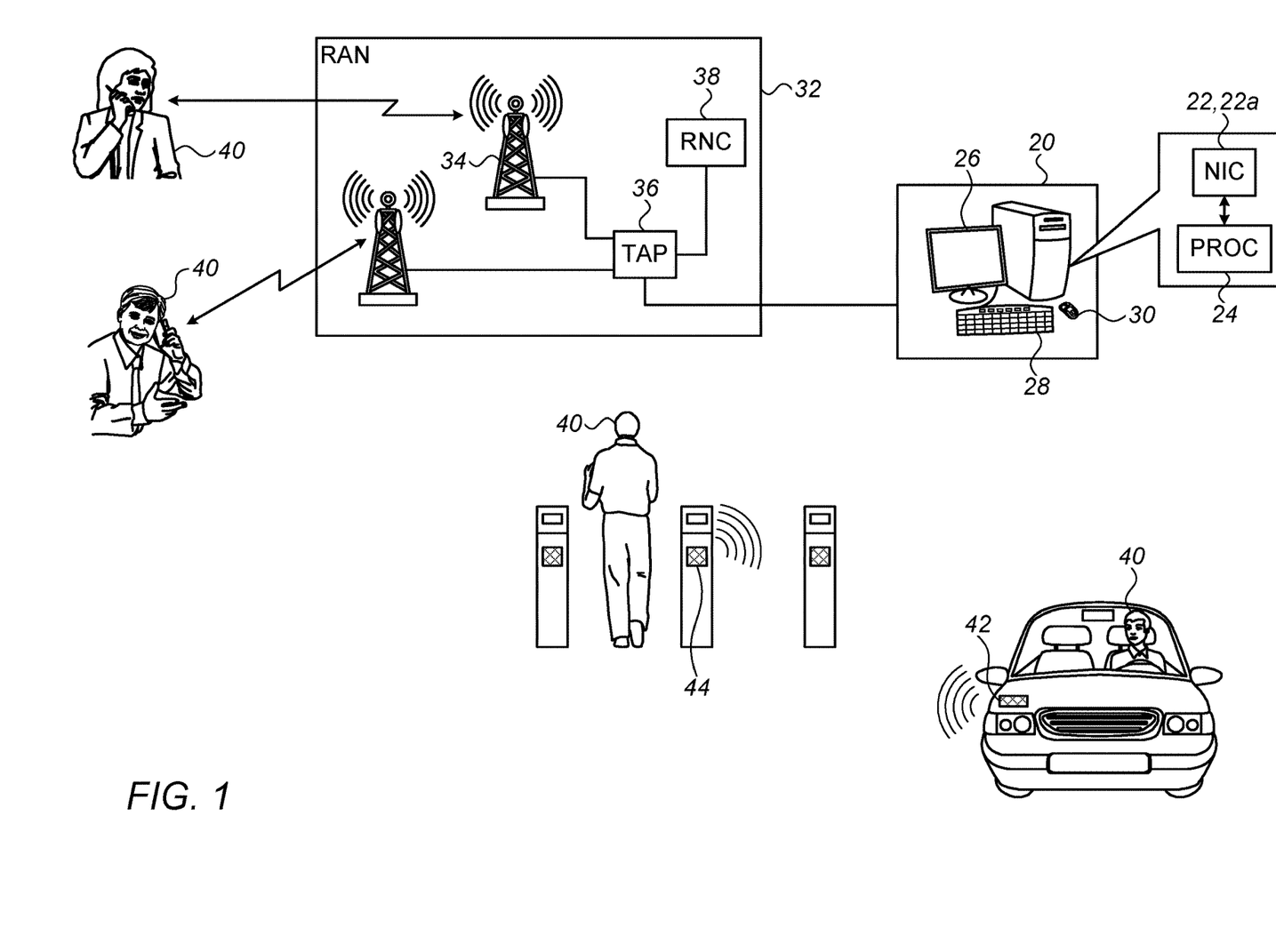
FIG. 1 is a schematic illustration of a system for identifying associations between subjects, in accordance with some embodiments of the present disclosure.

Reference is initially made to FIG. 1, which is a schematic illustration of a system 20 for identifying associations between subjects 40, in accordance with some embodiments of the present disclosure. System 20 comprises at least one communication interface 22, such as a network interface controller (NIC) 22a, and a processor 24. As described in detail below, processor 24 is configured to track the respective locations of subjects 40 within a plurality of geographic areas and during a plurality of time intervals, using tracking data received via communication interface 22. Based on the tracking, the processor identifies pairs of subjects 40 who are associated with (or "related to") one another.

In some embodiments, the processor identifies the subjects' locations from tracking data received from one or more taps 36 located in a cellular network. For example, in a Universal Mobile Telecommunications System (UMTS) cellular network, a tap 36 may be located between the base stations 34 and the radio network controller (RNC) 38 of the radio access network (RAN) 32 of the network. In such embodiments, tap 36 may continually receive from base stations 34, for each subject 40, parameters related to the subject's cellular device (e.g., ratios of signal to interference, received signal code powers, and round trip times), in association with an identifier of the device. The tap may then communicate these parameters to the processor. These parameters indicate the location of the subject, in that, based on these parameters, the processor may compute (e.g., using triangulation) the location of the device, and hence, the location of the subject. Alternatively or additionally, to track the subjects' locations, processor 24 may receive information from a tap at any other location in the cellular network, such as within the core network of the cellular network.

Alternatively or additionally to receiving tracking data from a cellular network, processor 24 may receive tracking data from tracking sensors 42 located, for example, within the vehicle of a subject or on the clothing of a subject. Each sensor 42 continually communicates the sensor's location to the processor, such that, as the sensor moves with the subject, the processor may track the subject's location.

Alternatively or additionally, other sensors 44, such as an imaging sensor or other type of electronic sensor located at the entrance to a particular area, may report the movement of a particular subject into, or from, the area. Thus, for example, responsively to a subject swiping a card to gain entry to his place of work, a sensor 44 may report the subject's entry to the processor. Alternatively or additionally, the processor may monitor communication traffic, e.g., over the Internet, and, from this traffic, extract information that relates to the subjects' locations.

Alternatively or additionally, any other suitable tracking technique may be used. In general, tracking data may be received by processor 24 wirelessly and/or wiredly, using any suitable communication protocol, such as the Internet Protocol (IP). Communication interface 22 may comprise any suitable hardware or software elements, alternatively or additionally to NIC 22a, for facilitating receipt of these data.

Prior to, while, or subsequently to tracking the subjects, the processor discretizes the time over which the subjects are tracked. In particular, the processor divides the time over which the subjects are tracked into intervals, each of which may be of any suitable length, such as 30 minutes, 1 hour, or two hours. In general, the time intervals are not necessarily of equal length, i.e., some of the time intervals may be longer than others. (For example, nighttime intervals may be longer than daytime intervals.)

Similarly, the processor discretizes the entire area over which the subjects are tracked, by partitioning this entire area into separate geographic areas, e.g., using the Military Grid Reference System (MGRS), and/or any other suitable partitioning technique. In general, the geographic areas are not necessarily of equal size, i.e., some of the areas may be larger than others. For example, one geographic area may span a large outdoor park, another may cover a smaller city block, and yet another may include only a single building.

Typically, in addition to communication interface 22 and processor 24, system 20 comprises a display 26. Processor 24 may be configured to display, on display 26, any relevant output, such as an output that indicates that a given pair of the subjects are associated with one another, and/or a likelihood of such an association. System 20 may further comprise one or more input devices, such as a keyboard 28 and a mouse 30, which may be used by a user to interact with the system.

In some embodiments, the functionality of processor 24, as described herein, is implemented solely in hardware, e.g., using one or more Application-Specific Integrated Circuits (ASICs) or Field-Programmable Gate Arrays (FPGAs). In other embodiments, the functionality of processor 24 is implemented at least partly in software. For example, in some embodiments, processor 24 may be embodied as a programmed digital computing device comprising at least a central processing unit (CPU) and random access memory (RAM). Program code, including software programs, and/or data are loaded into the RAM for execution and processing by the CPU. The program code and/or data may be downloaded to the processor in electronic form, over a network, for example. Alternatively or additionally, the program code and/or data may be provided and/or stored on non-transitory tangible media, such as magnetic, optical, or electronic memory. Such program code and/or data, when provided to the processor, produce a machine or special-purpose computer, configured to perform the tasks described herein.

Calculating Vectors of Normalized Weights

Figure 2:
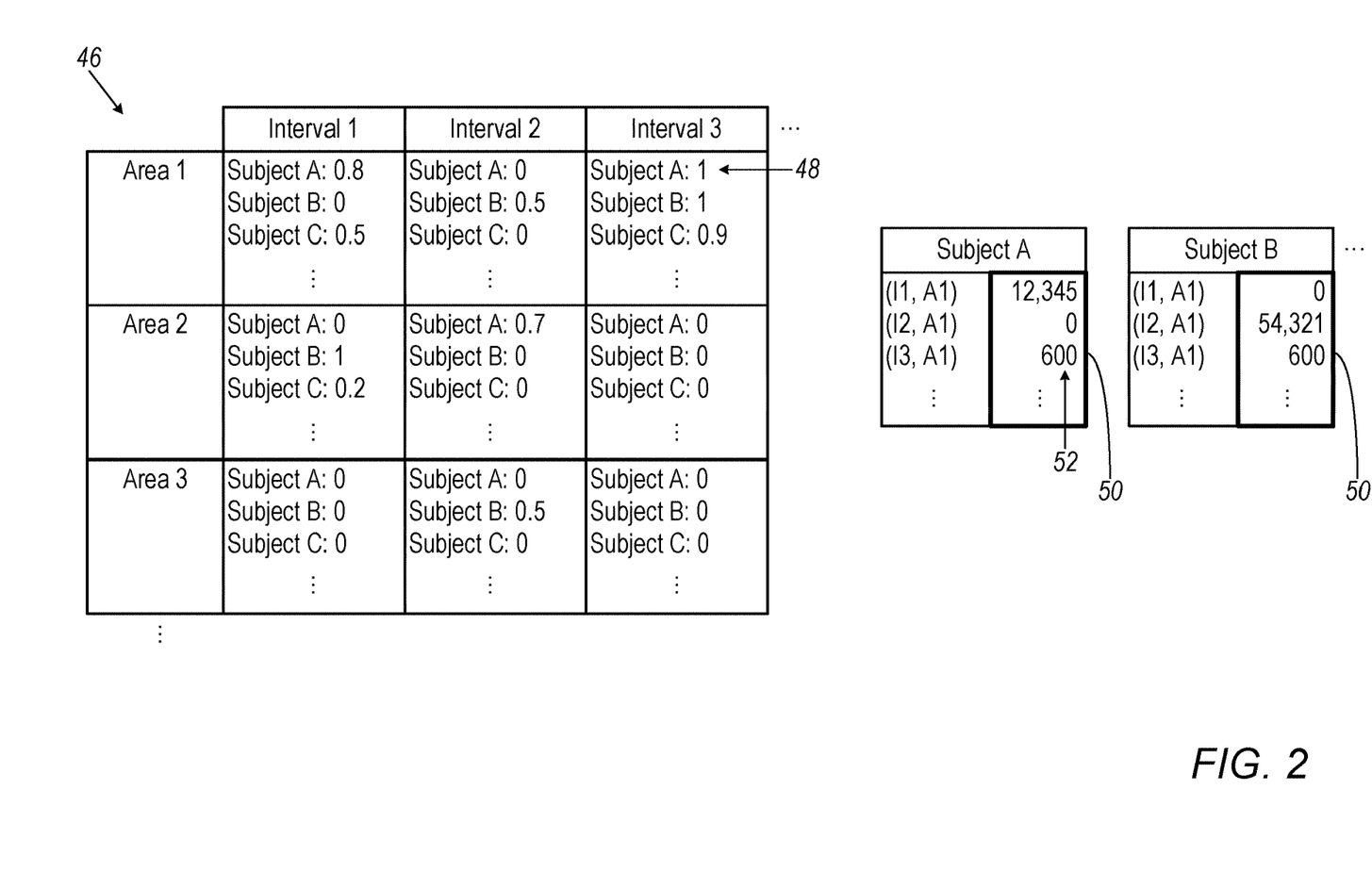
FIG. 2 is a schematic illustration of a plurality of location-history vectors computed from location information, in accordance with some embodiments of the present disclosure.

Reference is now made to FIG. 2, which is a schematic illustration of a plurality of location-history vectors 50 computed from location information 46 by processor 24, in accordance with some embodiments of the present disclosure.

Further to receiving the tracking data as described above with reference to FIG. 1, processor 24 extracts, from the data, location information 46. In particular, in response to the tracking data, the processor calculates, for each of the subjects, for each of the time intervals, for each of the geographic areas, a weight 48 that quantifies the degree to which the tracking data indicate that the subject was located in the geographic area during the time interval. (Hence, each weight 48 may be said to correspond to the combination of one of the subjects, one of the geographic areas, and one of the time intervals.) Thus, for example, given "S" subjects, "G" geographic areas, and "T" time intervals, the processor calculates a total of S*G*T weights 48. Location information 46 includes all of the computed weights.

By way of example, FIG. 2 shows a hypothetical snippet of location information 46, in which various weights are shown for (i) three subjects: Subject A, Subject B, and Subject C; (ii) three intervals: Interval 1, Interval 2, Interval 3; and (iii) three areas: Area 1, Area 2, Area 3. (Thus, a total of 27 weights are shown.) Although FIG. 2 assumes that weights 48 are on a scale of 0 to 1, it is noted that the weights may, alternatively, span any other suitable range.

Typically, each of the weights is calculated in response to the percentage of the time interval during which the subject was located in the geographic area that is indicated by the tracking data. Alternatively or additionally, the processor may calculate a level of confidence that the tracking data indicate that the subject was located in the geographic area during the time interval, and then calculate the weight responsively to the level of confidence. For example, a particular tracking signal received by the processor may indicate the location of the subject with relatively little precision, such that the signal effectively specifies a range of possible locations for the subject, spanning a plurality of geographic areas. In such a case, the processor may calculate a respective level of confidence for each of the geographic areas, responsively to the percentage of the range that is included within the geographic area. The processor may then calculate the respective weights for the geographic areas, based on these levels of confidence.

Typically, each weight is calculated in response to both of the aforementioned factors, e.g., by multiplying the level of confidence with the percentage of the time interval. For example, in response to ascertaining, based on the tracking data, that Subject A was located in Area 1 during 100% of Interval 3, with a level of confidence of 100%, the processor may assign a maximum weight of 1 to Subject A for the interval-area pair that includes Interval 3 and Area 1, indicated by the notation "(Interval 3, Area 1)." Conversely, if the processor does not receive any indication that Subject A was present in Area 1 during Interval 2, the processor may assign a minimum weight of 0 to Subject A for the interval-area pair (Interval 2, Area 1). As another example, the processor may assign an intermediate weight of 0.5 to Subject C for the interval-area pair (Interval 1, Area 1), if (i) the processor ascertains, with a level of confidence of 100%, that Subject C was located in Area 1 for 50% of Interval 1, or (ii) the processor ascertains that Subject C was located in Area 1 for 100% of Interval 1, but with a level of confidence of only 50%.

Subsequently to collecting location information 46, the processor (i) selects at least some of the interval-area pairs, (ii) normalizes those weights 48 corresponding to the selected interval-area pairs, such as to yield a plurality of normalized weights 52, and then (iii) constructs a respective one-dimensional or two-dimensional location-history vector 50 for each of the tracked subjects, by assigning, to the vector, those normalized weights 52 that correspond to the subject (i.e., that correspond to respective combinations of the subject with the selected interval-area pairs). In other words, the processor constructs, for each of the tracked subjects, a vector 50 of normalized weights 52, where each normalized weight 52 corresponds to a different respective selected interval-area pair. For example, FIG. 2 shows, for Subject A, a normalized weight of 12,345 for the interval-area pair (Interval 1, Area 1), indicated in FIG. 2 by the notation "(I1, A1)." The paragraphs below provide further description with regards to the construction of vectors 50.

Typically, vectors 50, which are of the same size for each of the subjects, do not contain a normalized weight for each of the interval-area pairs. Rather, prior to constructing vectors 50, the processor selects a subset of the interval-area pairs from the entire set of interval-area pairs, responsively to weights 48. In particular, based on weights 48, the processor selects those interval-area pairs that provide more information than the other interval-area pairs, as described below. The processor then normalizes the weights that correspond to the selected interval-area pairs, and assigns these normalized weights to vectors 50, while ignoring the other weights. Thus, for example, given 1000 different geographic areas and 1000 different time intervals, the number of elements in each of vectors 50 may be much less than 1,000,000; for example, this number may be between 1,000 and 10,000.

In some embodiments, to select the subset of the interval-area pairs, the processor first computes, for each interval-area pair, the sum of the subset of the weights that correspond to the interval-area pair (i.e., that correspond to respective combinations of the subjects with the interval-area pair). For example (ignoring, for ease of description, any subjects other than the three subjects shown in FIG. 2), the processor may compute a sum of 1.3 (=0.8+0.5) for (I1,A1). Next, in response to the sums, the processor selects the subset of the interval-area pairs. For example, the processor may select those interval-area pairs whose respective weight sums are below a predefined threshold number. (This threshold number may be fixed; alternatively, it may be variable, in that it may be calculated based on a percentile of the weight sums.) The processor may thus reject those interval-area pairs that provide relatively little information by virtue of being included in the respective location histories of a relatively large number of subjects. Alternatively or additionally, the processor may require that the respective weight sums of the selected interval-area pairs be above another (fixed or variable) predefined threshold, thus rejecting those interval-area pairs that provide relatively little information by virtue of being included in the respective location histories of only a small number of subjects.

Alternatively, to select the subset of the interval-area pairs, the processor may compute, for each interval-area pair, the number of weights that correspond to the interval-area pair and are greater than zero. For example (ignoring, for ease of description, any subjects other than the three shown in FIG. 2), the processor may count two non-zero weights for (I1,A1). Next, the processor may select the subset responsively to the numbers, by selecting those interval-area pairs whose number of non-zero weights is less than a first threshold, and/or greater than a second threshold. (This technique is effectively a variation of the previous technique, in which all of the non-zero weights are rounded to one prior to computing the weight sums.)

Subsequently, for each of the selected interval-area pairs, the processor calculates a respective normalizing factor, which quantifies the commonality, or "frequency," of the interval-area pair in the subjects' location histories. The processor then normalizes, by the normalizing factor, the subset of the weights corresponding to the interval-area pair. For example, the processor may compute each normalized weight 52 by dividing the corresponding "raw" weight 48 by the normalizing factor. In general, the normalized weights provide more information as to any potential relationships between the subjects, relative to the raw weights.

For example, assuming the weights are normalized by being divided by the normalizing factors, FIG. 2 implies a normalizing factor of 0.0017 for (I3, A1), as evidenced by the normalized weight of 600 for both Subject A and Subject B (1/0.0017=600). On the other hand, FIG. 2 implies a normalizing factor of only 0.0000648 for (I1, A1), as evidenced by the normalized weight of 12,345 for Subject A (0.8/0.0000648=12,345). The difference between these normalizing factors indicates that (I1, A1) is much less common than (I3, A1), such that the presence of two different subjects in Area 1 during Interval 1 is more indicative of a potential relationship between the two subjects, relative to the presence of two different subjects in Area 1 during Interval 3. Hence, by normalizing the weights, the processor causes the element in vector 50 corresponding to (I1, A1) to have greater significance than the element corresponding to (I3, A1).

In some embodiments, each normalizing factor is calculated as (i) an increasing function of the sum of those of the weights that correspond to the interval-area pair, and (ii) a decreasing function of the total sum of the weights. For example, using the notation $w_{ijk}$ to indicate the weight for the $i^{th}$ subject, the $j^{th}$ interval, and the $k^{th}$ area, the normalizing factor may calculated, for any specific interval-area pair $(I_M, A_N)$, as $(\Sigma_i w_{iMN}/\Sigma_{i,j,k} w_{ijk})$, or as the logarithm of this ratio.

For example (ignoring, for ease of description, any subjects and interval-area pairs other than those shown in FIG. 2), the processor may calculate a sum of 1.3 for (I1, A1), a sum of 0.5 for (I2, A1), a sum of 2.9 for (I3, A1), a sum of 1.2 for (I1, A2), a sum of 0.7 for (I2, A2), a sum of 0.5 for (I2, A3), and a sum of zero for each of the other interval-area pairs. The total sum of the weights is thus the sum of these sums, i.e., 7.1. Accordingly, the processor may, for example, calculate a normalizing factor of 0.183 (=1.3/7.1) for (I1, A1). (To avoid any confusion, it is noted that this normalizing factor differs from the implied normalizing factor described above, since this normalizing factor does not account for any subjects or interval-area pairs not shown in FIG. 2, and, furthermore, assumes one particular calculation technique.)

Alternatively, each normalizing factor may be calculated as (i) an increasing function of the number of those of the weights that correspond to the interval-area pair and are greater than zero (which is equivalent to the number of subjects for whom the weight that corresponds to the interval-area pair is greater than zero), and (ii) a decreasing function of the total number of subjects. For example, for any specific interval-area pair $(I_M, A_N)$, the normalizing factor may be calculated as $(\Sigma_i(w_{iMN}>0)/S)$, where S is the total number of subjects, or the logarithm of this ratio. For example (ignoring, for ease of description, any subjects other than those shown in FIG. 2), the processor may calculate a normalizing factor of 0.67 (=2/3) for (I1, A1).

Subsequently to assigning the normalized weights to vectors 50, the processor may reduce the dimensionality of the vectors, e.g., using Principal Component Analysis (PCA). Alternatively or additionally, the processor may further normalize each vector, e.g., such that the squares of the weights in the vector sum to one.

Identifying Associated Subjects

Subsequently to computing vectors 50, the processor calculates the cosine similarity, Euclidean distance, or any other suitable measure of similarity between each of one or more pairs of the vectors. The processor then generates an output (e.g., a visual output on display 26) indicating respective pairings of one or more pairs of the subjects, in response to the calculated measures of similarity.

For example, in response to a query from a user regarding a particular SOI, the processor may calculate respective measures of similarity between (i) the vector belonging to the SOI, and (ii) the respective vectors belonging to one or more other subjects. In response to ascertaining that the measure of similarity between the vector of the SOI and any of the other vectors is greater than a predefined threshold, the processor may ascertain that the SOI and the subject to whom the other vector belongs have a relatively high likelihood of being associated with one another. In response thereto, the processor may generate an output that indicates a pairing of the two subjects. For example, the output may explicitly state that the two subjects are likely associated with one another, or it may simply display the respective identities of the two subjects in a manner that implies an association. Optionally, the processor may further compute, from the relevant similarity measure, a confidence level that the pair of subjects are associated with one another. This confidence level, or "score," may also be output by the processor.

Alternatively, in response to the computed measures of similarity for the SOI, the processor may generate an output indicating respective pairings of the SOI with those of the other subjects whose respective vectors are most similar to the vector of the SOI. For example, the output may include the top N pairings for the SOI, by associating, with the SOI, a predefined number N of other subjects having the highest measures of similarity with respect to the SOI.

As yet another alternative, even without first receiving a query regarding a particular SOI, the processor may output the top N pairings for each of the subjects, and/or any pair of subjects whose measure of similarity is greater than a predefined threshold.

In some embodiments, to save computing time and resources, the processor, prior to calculating the measures of similarity, clusters the vectors into a plurality of different clusters, and then selects pairs of vectors in response to each of these pairs being contained within the same cluster or within respective clusters that are nearby to one another (i.e., that are within a predefined threshold distance of one another). The processor then computes the measures of similarity for the selected pairs of vectors, but not for other pairs of vectors. Thus, any given vector may be compared only to those other vectors that belong either to the same cluster as the given vector, or to a nearby cluster. For example, if vectors 50 are of K elements each, the processor may partition the space that is spanned by the vectors into a plurality of K-dimensional volumes (such as hyperspheres or hypercubes), and then compare any given vector only with those vectors that are contained within the same volume as the given vector, or within a nearby volume.

Figure 3:
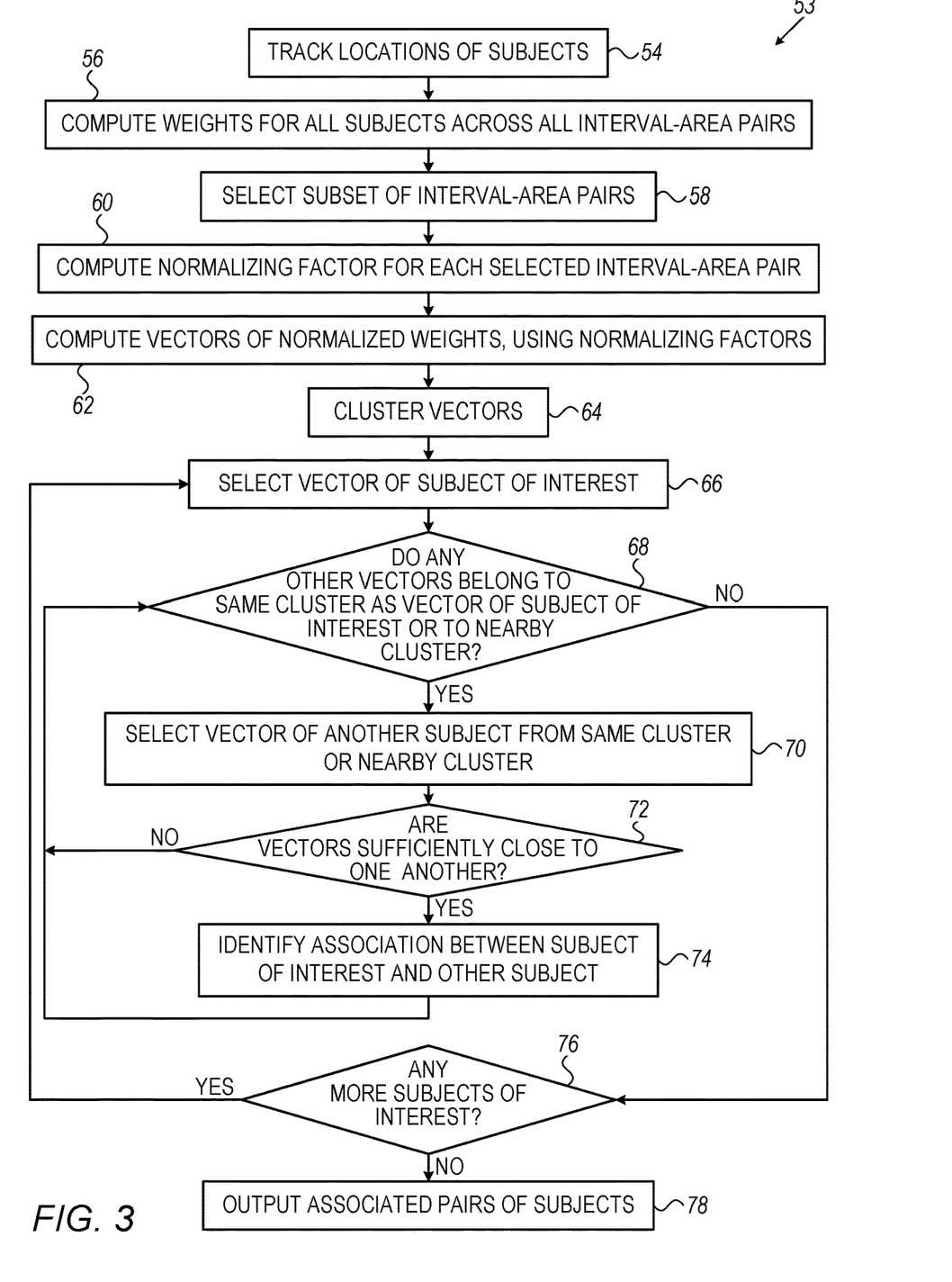
FIG. 3, which is a flow diagram for a method for identifying associated pairs of subjects, in accordance with some embodiments of the present disclosure.

Reference is now made to FIG. 3, which is a flow diagram for a method 53 for identifying associated pairs of subjects, in accordance with some embodiments of the present disclosure. (In general, most of the steps in method 53 were already described above, with reference to FIGS. 1-2.)

Method 53 begins with a tracking step 54, at which processor 24 tracks the locations of a plurality of subjects over several days, weeks, months, or years. Subsequently, the processor, at a weight-computing step 56, computes the weights for all subjects across all interval-area pairs, i.e., the processor computes a respective weight for each combination of a subject, a geographic area, and a time interval. (At least some of the weights may be computed during tracking step 54, i.e., while the tracking is ongoing.) Next, at a subset-selecting step 58, the processor selects a subset of the interval-area pairs, which are deemed by the processor to provide more information than the other interval-area pairs.

Subsequently, the processor, at a normalizing-factor-computing step 60, computes a normalizing factor for each interval-area pair in the selected subset. Next, at a vector-computing step 62, the processor uses the normalizing factors to compute a vector of normalized weights for each of the subjects. In other words, for each selected interval-area pair, the processor normalizes the subset of the weights that correspond to the interval-area pair by the normalizing factor for the interval-area pair. Subsequently, the processor constructs, for each subject, a respective vector that includes those of the normalized weights that correspond to the subject. As noted above, the processor may then reduce the dimensionality of the vectors.

Subsequently, the processor clusters the vectors, at a clustering step 64. Next, the processor identifies associated pairs of subjects. First, the processor selects the vector of an SOI, at a first vector-selecting step 66. Subsequently, the processor checks, at a vector-identifying step 68, whether other vectors belong to the same cluster as the selected vector, or to a nearby cluster. If yes, the processor selects a vector of another subject from the same cluster or from a nearby cluster, at a second vector-selecting step 70. Subsequently, the processor, at a vector-comparing step 72, checks whether the two selected vectors are sufficiently close to one another. If yes, the processor identifies that the SOI is associated with the other subject, at an association-identifying step 74. The processor then returns to vector-identifying step 68, and, if appropriate, identifies one or more other subjects who are associated with the SOI.

Following the identification of any subjects who are associated with the SOI, the processor checks, at a subject-of-interest-identifying step 76, whether any other subjects of interest remain. (Each of the subjects of interest may be specified by a user, or the processor may simply iterate through all of the subjects, treating each of the subjects, in turn, as an SOI.) For each of these other subjects of interest, the processor identifies any associations, as described above. Following the identification of any associations for all subjects of interest, the processor, at an outputting step 78, outputs all associated pairs of subjects.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
a communication interface; and
a processor, executing instructions to:
receive, via the communication interface, tracking data that indicate respective locations of a plurality of subjects within a plurality of geographic areas and during a plurality of time intervals;
calculating a plurality of weights that respectively correspond to each combination of a subject, a geographic area, and a time interval;
select a plurality of interval-area pairs, each of which includes a respective one of the geographic areas and a respective one of the time intervals;
for each of the selected interval-area pairs, normalize a respective subset of the weights to construct a plurality of vectors that correspond to respective combinations of the subject with the selected interval-area pairs to determine measures of similarity between one or more pairs of the vectors; and
in response to the measures of similarity, identify an association of the subject and at least one other subject of interest.

2. The system according to claim 1, wherein the processor further executes instructions to receive the tracking data from a cellular the network.

3. The system of claim 1, wherein the processor further executes instructions to maintain a location history for the plurality of subjects.

4. The system according to claim 1, wherein the processor further executes instructions to calculate each of the weights responsively to a percentage of the time interval during which the subject was located in the geographic area that is indicated by the tracking data.

5. The system according to claim 1, wherein the processor further executes instructions to calculate each of the weights by:
calculating a level of confidence that the tracking data indicate that the subject was located in the geographic area during the time interval; and
calculating the weight responsively to the level of confidence.

6. The system according to claim 1, wherein the processor further executes instructions to normalize the respective subset of the weights by:
calculating a normalizing factor as (i) an increasing function of a sum of the subset of the weights, and (ii) a decreasing function of a total sum of the weights; and
normalizing the subset of the weights by the normalizing factor.

7. The system according to claim 1, wherein the processor further executes instructions to normalize the respective subset of the weights by:
calculating a normalizing factor as (i) an increasing function of a number of those of the weights in the subset that are greater than zero, and (ii) a decreasing function of a total number of the subjects; and
normalizing each of the weights in the subset by the normalizing factor.

8. The system according to claim 1, wherein the processor further executes instructions to, prior to calculating the measures of similarity:
cluster the vectors into a plurality of different clusters; and
subsequently to clustering the vectors, select the pairs of the vectors in response to each of the pairs of the vectors being contained within a same one of the clusters or within respective ones of the clusters that are within a predefined threshold distance of one another.

9. The system according to claim 1, wherein the processor further executes instructions to output the association of the subject and the at least one other subject, and to visually display the output.

10. A non-transitory computer readable having computer executable instructions stored thereon that when execute by a processor causes the processor to:
receive, via the communication interface, tracking data that indicate respective locations of a plurality of subjects within a plurality of geographic areas and during a plurality of time intervals;
calculating a plurality of weights that respectively correspond to each combination of a subject, a geographic area, and a time interval;
select a plurality of interval-area pairs, each of which includes a respective one of the geographic areas and a respective one of the time intervals;
for each of the selected interval-area pairs, normalize a respective subset of the weights to construct a plurality of vectors that correspond to respective combinations of the subject with the selected interval-area pairs to determine measures of similarity between one or more pairs of the vectors; and in response to the measures of similarity, identify an association of the subject and at least one other subject of interest.

11. A method, comprising:

receiving, via a communication interface of a computing device, tracking data that indicate respective locations of a plurality of subjects within a plurality of geographic areas and during a plurality of time intervals;

calculating a plurality of weights that respectively correspond to each combination of a subject, a geographic area, and a time interval;

selecting a plurality of interval-area pairs, each of which includes a respective one of the geographic areas and a respective one of the time intervals;

for each of the selected interval-area pairs, normalizing a respective subset of the weights to construct a plurality of vectors that correspond to respective combinations of the subject with the selected interval-area pairs to determine measures of similarity between one or more pairs of the vectors; and in response to the measures of similarity, identifying an association of the subject and at least one other subject of interest.

12. The method according to claim 11, further comprising receiving the tracking data from a cellular the network.

13. The method of claim 11, further comprising maintaining a location history for the plurality of subjects.

14. The method according to claim 11, further comprising calculating each of the weights responsively to a percentage of the time interval during which the subject was located in the geographic area that is indicated by the tracking data.

15. The method according to claim 11, further comprising calculating each of the weights by:

calculating a level of confidence that the tracking data indicate that the subject was located in the geographic area during the time interval, and calculating the weight responsively to the level of confidence.

16. The method according to claim 11, further comprising normalizing the respective subset of the weights by:

calculating a normalizing factor as (i) an increasing function of a sum of the subset of the weights, and (ii) a decreasing function of a total sum of the weights, and normalizing the subset of the weights by the normalizing factor.

17. The method according to claim 11, further comprising normalizing the respective subset of the weights by:

calculating a normalizing factor as (i) an increasing function of a number of those of the weights in the subset that are greater than zero, and (ii) a decreasing function of a total number of the subjects, and normalizing each of the weights in the subset by the normalizing factor.

18. The method according to claim 11, further comprising, prior to calculating the measures of similarity:

clustering the vectors into a plurality of different clusters, and subsequently to clustering the vectors, selecting the pairs of the vectors in response to each of the pairs of the vectors being contained within a same one of the clusters or within respective ones of the clusters that are within a predefined threshold distance of one another.

19. The method according to claim 11, further comprising outputting the association of the subject and the at least one other subject, and to visually display the output.

20. The method according to claim 19, further comprising outputting one or more pairings of other subjects associated with the subject.

* * * * *